United States Patent
Tanaka

(10) Patent No.: US 11,262,564 B2
(45) Date of Patent: Mar. 1, 2022

(54) OPTICAL ELEMENT, DISPLAY DEVICE USING SAME, AND PHOTORECEPTOR DEVICE

(71) Applicant: SHIMADZU CORPORATION, Kyoto (JP)

(72) Inventor: Masato Tanaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 15/767,000

(22) PCT Filed: Jan. 18, 2016

(86) PCT No.: PCT/JP2016/051210
§ 371 (c)(1),
(2) Date: Apr. 9, 2018

(87) PCT Pub. No.: WO2017/125992
PCT Pub. Date: Jul. 27, 2017

(65) Prior Publication Data
US 2018/0307014 A1    Oct. 25, 2018

(51) Int. Cl.
*G02B 17/08* (2006.01)
*G02B 27/00* (2006.01)
(Continued)

(52) U.S. Cl.
CPC ........... *G02B 17/08* (2013.01); *G02B 6/0055* (2013.01); *G02B 27/0081* (2013.01);
(Continued)

(58) Field of Classification Search
CPC .. G02B 27/00–648; G02B 6/00–12033; G02B 2027/0105–0198; G02B 27/01–0198
See application file for complete search history.

(56) References Cited

U.S. PATENT DOCUMENTS

| 9,519,092 | B1* | 12/2016 | Miao | G02B 5/3083 |
| 2007/0070859 | A1* | 3/2007 | Hirayama | G02B 5/32 |
| | | | | 369/112.04 |

(Continued)

FOREIGN PATENT DOCUMENTS

| JP | 2002-162598 A | 6/2002 |
| JP | 2011-164545 A | 8/2011 |

(Continued)

OTHER PUBLICATIONS

International Search Report for PCT/JP2016/051210 dated Mar. 29, 2016 [PCT/ISA/210].

(Continued)

*Primary Examiner* — Michelle M Iacoletti
*Assistant Examiner* — Christopher A Lamb, II
(74) *Attorney, Agent, or Firm* — Sughrue Mion, PLLC

(57) ABSTRACT

In order to provide an optical element in which the occurrence of a region where no light beams are present (omission) is prevented, an optical element is provided with a main substrate which is manufactured from a light-transmitting material and in which a front surface and a rear surface are parallel to the setting directions, wherein at least one main beam splitter surface is provided obliquely to the setting directions and formed inside the primary substrate. The optical element is also provided with a sub substrate which is manufactured from a light transmitting material and in which a front surface and a rear surface are parallel to the setting directions, wherein a sub beam splitter surface is arranged at least between the front surface or the rear surface of the single sub substrate, and the rear surface or the front surface of the main substrate.

7 Claims, 15 Drawing Sheets

(51) Int. Cl.
   *G02B 27/01* (2006.01)
   *G02C 7/08* (2006.01)
   *G02B 27/02* (2006.01)
   *G02C 7/00* (2006.01)
   *H04N 5/64* (2006.01)
   *F21V 8/00* (2006.01)

(52) U.S. Cl.
   CPC ......... *G02B 27/0172* (2013.01); *G02B 27/02* (2013.01); *G02C 7/00* (2013.01); *G02C 7/086* (2013.01); *H04N 5/64* (2013.01); *G02B 2027/0178* (2013.01)

(56) References Cited

U.S. PATENT DOCUMENTS

| | | | | |
|---|---|---|---|---|
| 2009/0015929 A1* | 1/2009 | DeJong | ............ | G02B 27/0172 359/633 |
| 2009/0052047 A1* | 2/2009 | Amitai | ................ | G02B 6/0046 359/633 |
| 2013/0108229 A1* | 5/2013 | Starner | ................ | G02B 27/01 385/119 |
| 2015/0138646 A1* | 5/2015 | Tatsugi | ................ | G02B 6/005 359/633 |
| 2018/0039082 A1* | 2/2018 | Amitai | ................ | G02B 27/148 |
| 2018/0239150 A1 | 8/2018 | Yoshida et al. | | |

FOREIGN PATENT DOCUMENTS

| | | |
|---|---|---|
| JP | 2011-186332 A | 9/2011 |
| JP | 2012-058404 A | 3/2012 |
| JP | 2015-096883 A | 5/2015 |
| WO | 2011/024291 A1 | 3/2011 |
| WO | 2017/038350 A1 | 3/2017 |

OTHER PUBLICATIONS

Communication dated Aug. 23, 2019, from the European Patent Office in counterpart European Application No. 16886235.7.

* cited by examiner

OPTICAL ELEMENT, DISPLAY DEVICE USING SAME, AND PHOTORECEPTOR DEVICE

This is a National Stage of Application No. PCT Application No. PCT/JP2016/051210, filed Jan. 18, 2016.

TECHNICAL FIELD

The present invention relates to an optical element for propagating light in a set direction, and to a display device and photoreceptor device using such an optical element, relating in particular to a display device suitable for monitors for information appliances that can be used outside of a desktop environment, such as wearable computers which are worn on the body by means of a waist belt, personal accessories and the like, and communication devices such as portable telephones which can be carried by placing in a knapsack or pocket.

BACKGROUND ART

Among display devices for information appliances of the type worn on the body, the goggle type format which also allows the outside world to be seen is becoming mainstream. FIG. 3 is an external view showing a goggle type display (display device) worn by a viewer, and FIG. 4 is a drawing illustrating the general configuration of a conventional goggle type display and the optical path in the XY plane.

Here, the goggle type display 101 is for the right eye, and defines an XYZ coordinate system having its origin at the center of the right eye E of a viewer viewing into the distance. The Y direction is to the front of the viewer, the Z direction is above the viewer, and the X direction (set direction) is to the left of the viewer.

The goggle type display 101 has an appearance similar to goggles, and comprises an output unit (output optical system) 40 which outputs image display light L, a light guide (optical element) 10 which is a substrate that internally reflects the image display light L from the output unit 40 and guides it to the eye E of the viewer, and a frame part F to which the output unit 40 and light guide 10 are attached (for example, see patent literature 1).

The output unit 40 has a housing as shown in FIG. 3, and inside this housing, comprises an output mechanism including a transmissive liquid crystal display 41, an optical system 42 and a light source (not illustrated), and a control unit (not illustrated) which outputs an image signal to the output mechanism.

The transmissive liquid crystal display 41, based on an image signal from the control unit, forms an image in a display region perpendicular to the output direction, and outputs an image display light L.

Optical system 42 transmits the image display light L of the display region. Optical system 42 is furthermore arranged at a distance in front of the transmissive liquid crystal display 41. As a result, the optical system 42 forms a virtual image of the observed object while transmitting image display light L of the display region.

Light guide 10 is a substrate fashioned from a light transmitting material such as glass (BK7, etc.), resin (polycarbonate, polymethacrylic acid (PMMA), cycloolefin, etc.) or the like and comprises a front surface 10a, a rear surface 10b located opposite the front surface 10a in the −Y direction, a right surface 10c, a left surface 10d located opposite the right surface 10c in the X direction, a top surface (not illustrated) and a bottom surface (not illustrated) located opposite the top surface in the Z direction, and furthermore has a beam splitter surface 11 formed inside. Here, the front surface 10a, the rear surface 10b, the top surface and the bottom surface are parallel to the X direction (set direction), while the left surface 10d is perpendicular to the X direction (set direction).

Furthermore, the right surface 10c is arranged so as to have an angle at to the X direction (set direction) when viewed from the Z direction. The output unit 40 is moreover arranged so as to cause the image display light L from the output mechanism to be inputted through the right surface 10c of the light guide 10 into the light guide 10 in a direction perpendicular to the right surface 10c. As a result, when image display light L from the output unit 40 enters inside the light guide 10 through the right surface 10c in a direction perpendicular to the right surface 10c, it advances substantially in the X direction (set direction).

The beam splitter surface 11 comprises three planar beam splitter surfaces, arranged in the X direction in the sequence: first beam splitter surface 11a, second beam splitter surface 11b, third beam splitter surface 11c. Furthermore, each of the beam splitter surfaces 11a through 11c are arranged at the same angle β to the X direction when viewed from the Z direction.

The first beam splitter surface 11a, second beam splitter surface 11b and third beam splitter surface 11c furthermore make it possible to reflect a predetermined fraction of the luminous flux of the inputted image display light L and to transmit a predetermined fraction of the luminous flux of the image display light L.

In such a goggle type display 101, first, the image display light L of the display region from the output unit 40 is inputted into the light guide 10 through the right surface 10c. Here, the image display light L from the output unit 40 is inputted through the right surface 10c into the light guide 10 in a direction perpendicular to the right surface 10c, and the right surface 10c causes the image display light L of the display region from the output unit 40 to be inputted such that it advances substantially in the X direction (set direction).

The front surface 10a and rear surface 10b cause the image display light L of the display region to advance in the X direction (set direction) while reflecting it in alternation multiple times, thereby leading it to the first beam splitter surface 11a. The first beam splitter surface 11a then reflects a predetermined fraction of the luminous flux of the inputted image display light L and transmits a predetermined fraction of the luminous flux of the image display light L. Namely, the luminous flux of image display light La is guided to the eye E of the viewer.

Furthermore, the image display light L which has passed through the first beam splitter surface 11a reaches the second beam splitter surface 11b. Here, the second beam splitter surface 11b reflects a predetermined fraction of the luminous flux of the inputted image display light L and transmits a predetermined fraction of the luminous flux of the image display light L. Namely, the luminous flux of image display light Lb is guided to the eye E of the viewer.

Moreover, the image display light L which has passed through the second beam splitter surface 11b reaches the third beam splitter surface 11c. Here, the third beam splitter surface 11c reflects a predetermined fraction of the luminous flux of the inputted image display light L and transmits a predetermined fraction of the luminous flux of the image display light L. Namely, the luminous flux of image display light Lc is guided to the eye E of the viewer.

PRIOR ART LITERATURES

Patent Literatures

Patent literature 1: Japanese Unexamined Patent Application Publication 2011-186332
Patent literature 2: Japanese Unexamined Patent Application Publication 2011-164545
Patent literature 3: WO2011/24291A1

SUMMARY OF THE INVENTION

Problem to be Solved by the Invention

However, in a goggle type display 101 as described above, images with a shadow generated in a portion thereof would sometimes be seen. FIG. 5 is an example of an image in which a shadow seen by the viewer has been generated by the goggle type display 101 of FIG. 4.

Means for Solving the Problem

The present applicant investigated methods that would allow the viewer to properly see the image, and found that in a goggle type display 101 as described above, the size of the luminous flux of the image display light L (the display region) is limited by the size of the right surface 10c, and with a luminous flux size that has been limited by the size of the right surface 10c shown in FIG. 4, regions occur in which luminous flux of image display light L propagating through the inside of the light guide 10 is not present (dropouts).

Here, FIG. 6 is a drawing illustrating the propagation range of luminous flux in the XY plane of the goggle type display 101 of FIG. 4, where symbols A in the drawing indicate luminous flux dropouts.

The occurrence of such regions in which luminous flux of the image display light propagating through the inside of the light guide is not present (dropouts) could conceivably be prevented by increasing the size of the right surface of the light guide and increasing the size of the inputted luminous flux. FIG. 7 is a plan view illustrating a light guide in which the size of the right surface and the size of the light flux have been increased. However, this sort of light guide 300 has protruding parts and is thus difficult to manufacture and also makes the output unit 340 larger and heavier.

Furthermore, Japanese Unexamined Patent Application Publication 2011-164545 discloses a display device comprising a first light guide for guiding image display light from a first output unit and a second light guide for guiding image display light from a second output unit, but since this device comprises two output units, it has the problem that it becomes larger and heavier. Furthermore, International Publication No. WO2011/24291 discloses a display device comprising a first light guide which reflects image display light by means of four surfaces—a front surface, rear surface, top surface and bottom surface, in order to guide it to a second light guide, and a second light guide for guiding the image display light from the first light guide, but this has the problem of making the device large and heavy.

Thus, the applicant discovered how to arrange a substance (secondary substrate) across a beam splitter surface (secondary beam splitter) in front of the light guide (main substrate) in order to prevent dropouts of luminous flux of the image display light propagating through the inside of the light guide without providing protruding parts as in light guide 300 and without increasing the size of the output unit 340, etc. It will be noted that the term beam splitter surface here refers to a surface having the function of reflecting a portion of the luminous flux and transmitting a portion of the luminous flux.

Accordingly, the image display light of the display region is reflected in alternation multiple time at the front surface and rear surface of the light guide, and when it reaches the front surface (secondary beam splitter surface) of the light guide, 100% of the luminous flux of the image display light is not reflected, but rather a predetermined fraction of the luminous flux of the image display light is reflected and advances into the light guide, and a predetermined fraction of the luminous flux of the image display light is transmitted and advances into the secondary substrate. Namely, a difference (offset) occurs between the optical path of the image display light advancing inside the light guide and the optical path of the image display light advancing inside the secondary substrate (the image display light is split by the secondary beam splitter surface and is magnified), and the occurrence of regions where luminous flux of image display light propagating through the inside of the light guide is not present (dropouts) can be prevented by making use of this difference (offset).

Namely, the optical element of the present invention comprises a main substrate fabricated from light transmitting material, whereof the front surface and rear surface are parallel to a set direction, and having at least one main beam splitter surface formed diagonally to the set direction inside the main substrate, which optical element further comprises a secondary substrate fabricated from light transmitting material, whereof the front surface and rear surface are parallel to a set direction, wherein a secondary beam splitter surface is arranged between the front surface of the secondary substrate and the rear surface of said main substrate or between the rear surface of the secondary substrate and the front surface of said main substrate.

Here, "set direction" is an arbitrary direction determined in advance by the designer, etc., and could be, for example, the left direction, right direction, top direction or bottom direction.

Effect of the Invention

With the optical element of the present invention, as described above, light is split and magnified by a secondary beam splitter surface, thus making it possible to prevent the occurrence of regions where luminous flux propagating through the inside of the main substrate is not present (dropouts).

(Other Means for Solving the Problem, and Effects)

Furthermore, in the optical element of the present invention, light may be inputted or outputted through a surface other than the front surface and rear surface of the main substrate and the front surface and rear surface of the secondary substrate.

With the optical element of the present invention, when the right surface, etc. of the secondary substrate is formed diagonally, the concentration of complex processing on a single substrate can be avoided, so productivity is improved.

Furthermore, when the width of the output mechanism is to be reduced, in the case where the image display light is inputted through the right surface of the main substrate, if the main substrate is made thinner, it is necessary to increase the number of main beam splitter surfaces in the main substrate in order to maintain the output range outputted by the main beam splitter surface, but by inputting the image display light through the right surface, etc. of the secondary substrate, the need to increase the number of main beam splitter surfaces of the main substrate is eliminated even if the secondary substrate is made thinner, so productivity is better.

Furthermore, in the optical element of the present invention, a reflective surface may be formed inside the main substrate or the secondary substrate, so that light enters through at least one surface from among the front surface and rear surface of the main substrate and the front surface and rear surface of the secondary substrate and either reaches the reflective surface or, after reaching the reflective surface, is outputted from at least one surface from among the front surface and rear surface of the main substrate and the front surface and rear surface of the secondary substrate.

The optical element of the present invention makes it possible to increase the degree of freedom in respect of the location where light enters inside the main substrate and secondary substrate and the location where it is outputted from inside the main substrate and secondary substrate.

Furthermore, in the optical element of the present invention, the secondary beam splitter surface may be arranged so that light is not reflected two or more times from the reflective surface.

In the display device of the present invention, a substrate of a fixed minimum thickness is arranged in front of the reflective surface, so luminous flux which is reflected two or more times from the reflective surface can be eliminated and the occurrence of stray light can be prevented.

The display device of the present invention may comprise an optical element as described above and an output optical system which outputs light.

With the display device of the present invention, regions where luminous flux is not present (dropouts) do not occur and the output mechanism can be made smaller and lighter.

Furthermore, as light progresses in a set direction, since there exists light which passes through the inside of the secondary substrate without being transmitted through the main beam splitter surface, the difference between the light quantity outputted to the outside from the first main beam splitter surface near the input location and the light quantity outputted to the outside from the Nth main beam splitter surface from the input location becomes smaller, making it possible to make the brightness (light quantity) more uniform.

Moreover, the photoreceptor device of the present invention may comprise an optical element as described above and a photoreceptor optical system which detects light.

With the photoreceptor device of the present invention, [sic] when optical components such as shown in FIG. 4 are used for a photoreceptor device, missing regions occur in the luminous flux (light flux which cannot be received), but with the photoreceptor device of the present invention, the total luminous flux reaching the main beam splitter surface can be received. Thus, the photoreceptor device of the present invention is able to sense objects of sensing located in any region of the luminous flux.

MODES FOR EMBODYING THE INVENTION

Modes of embodiment of the present invention will be described below using the drawings. It should be noted that the present invention is not limited to the mode of embodiment described below and includes various different configurations that do not depart from the gist of the present invention.

First Mode of Embodiment

Figure 1:
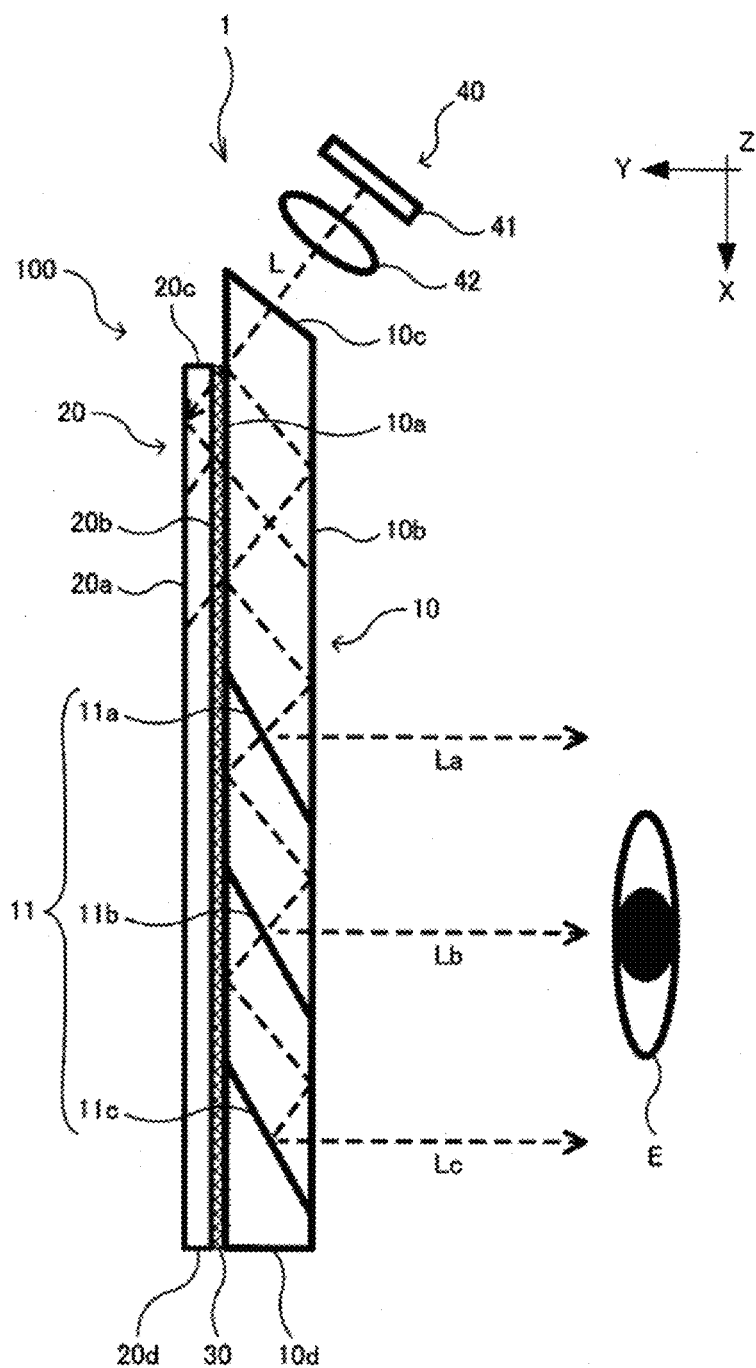
FIG. 1 A drawing illustrating the general configuration and optical path in the XY plane of a goggle type display of the present invention.
Figure 2:
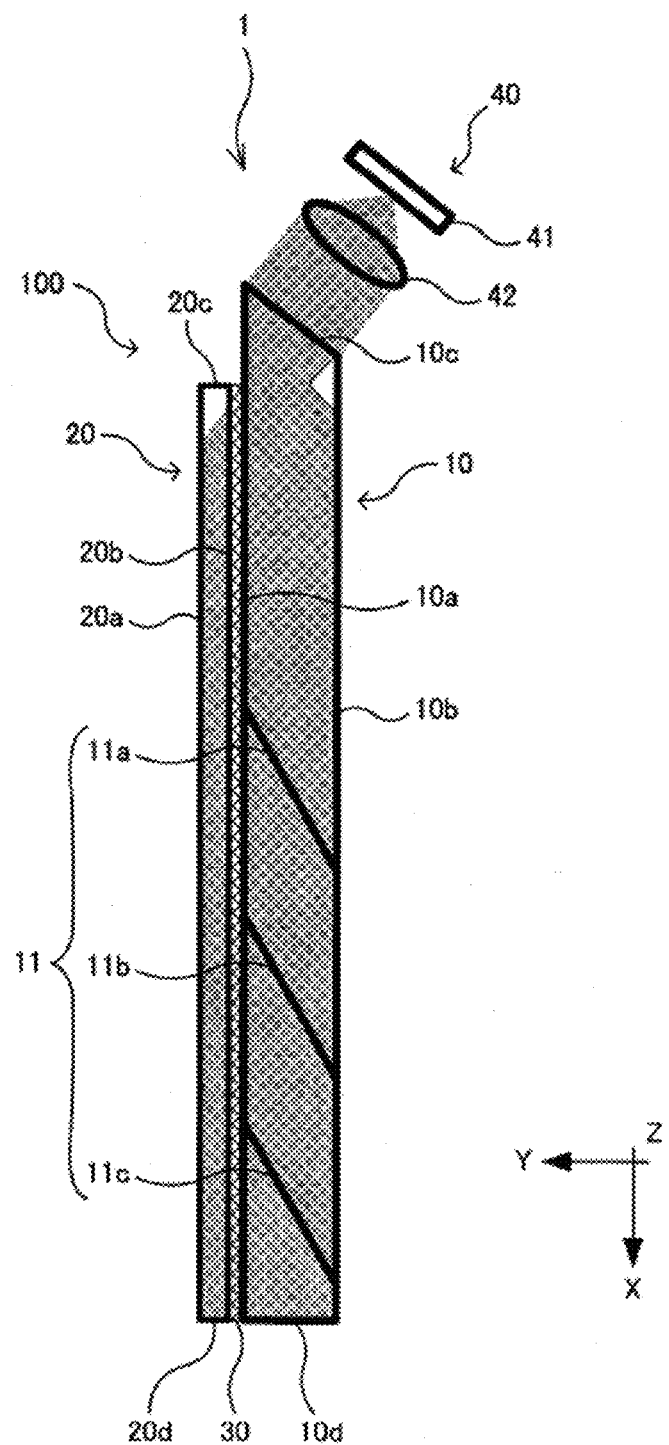
FIG. 2 A drawing illustrating the propagation range of luminous flux in FIG. 1.
Figure 3:
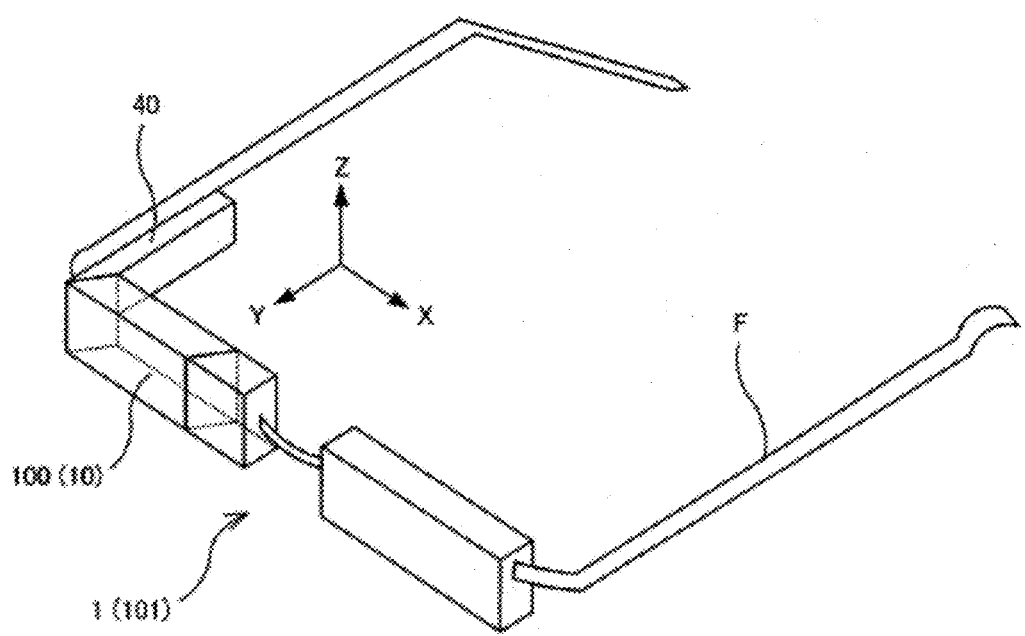
FIG. 3 An external view illustrating a goggle type display.
Figure 4:
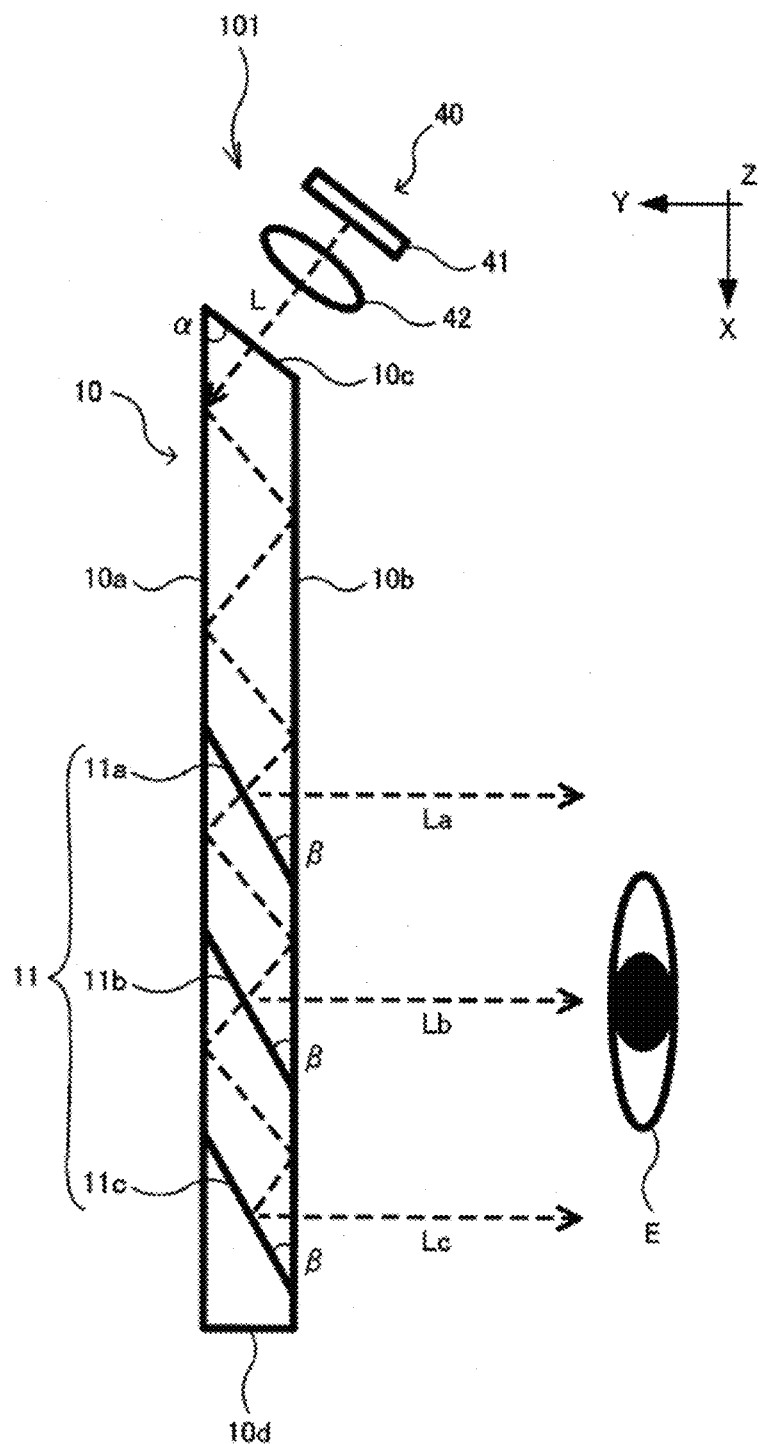
FIG. 4 A drawing illustrating the general configuration and optical path in the XY plane of a conventional goggle type display.
Figure 5:
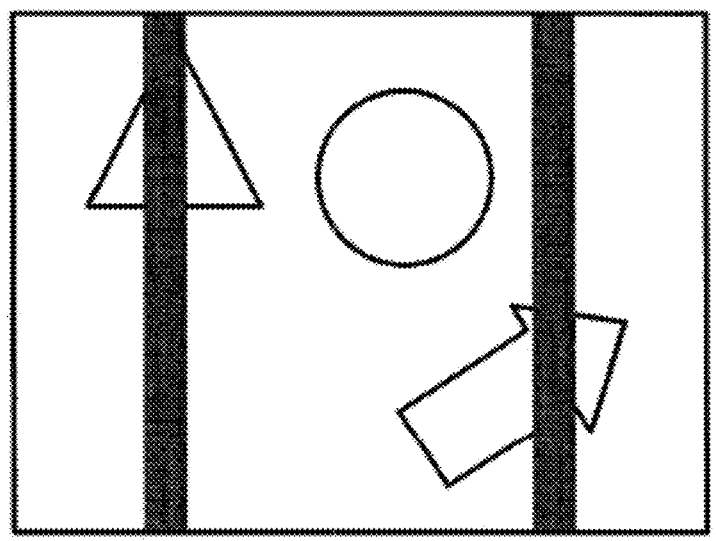
FIG. 5 A drawing illustrating an example of the image seen by the viewer based on the configuration of FIG. 4.
Figure 6:
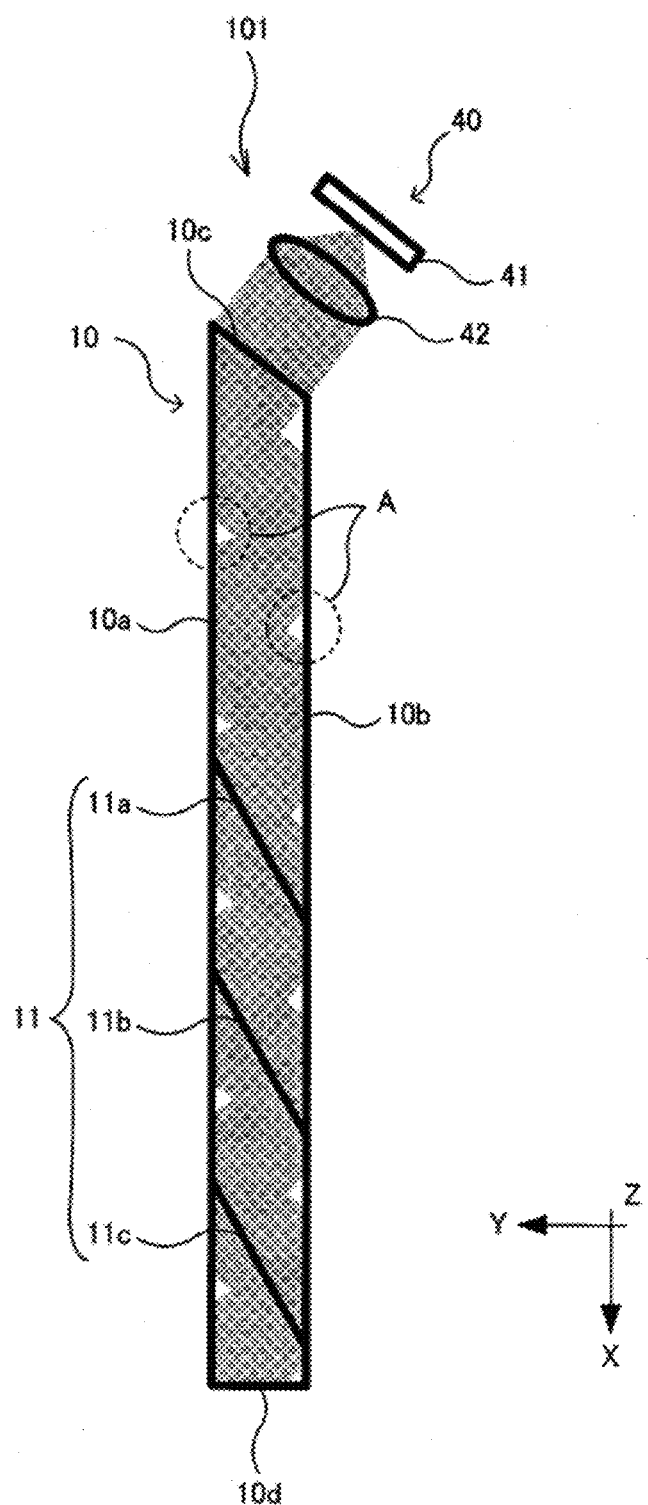
FIG. 6 A drawing illustrating the propagation range of luminous flux in FIG. 4.
Figure 7:
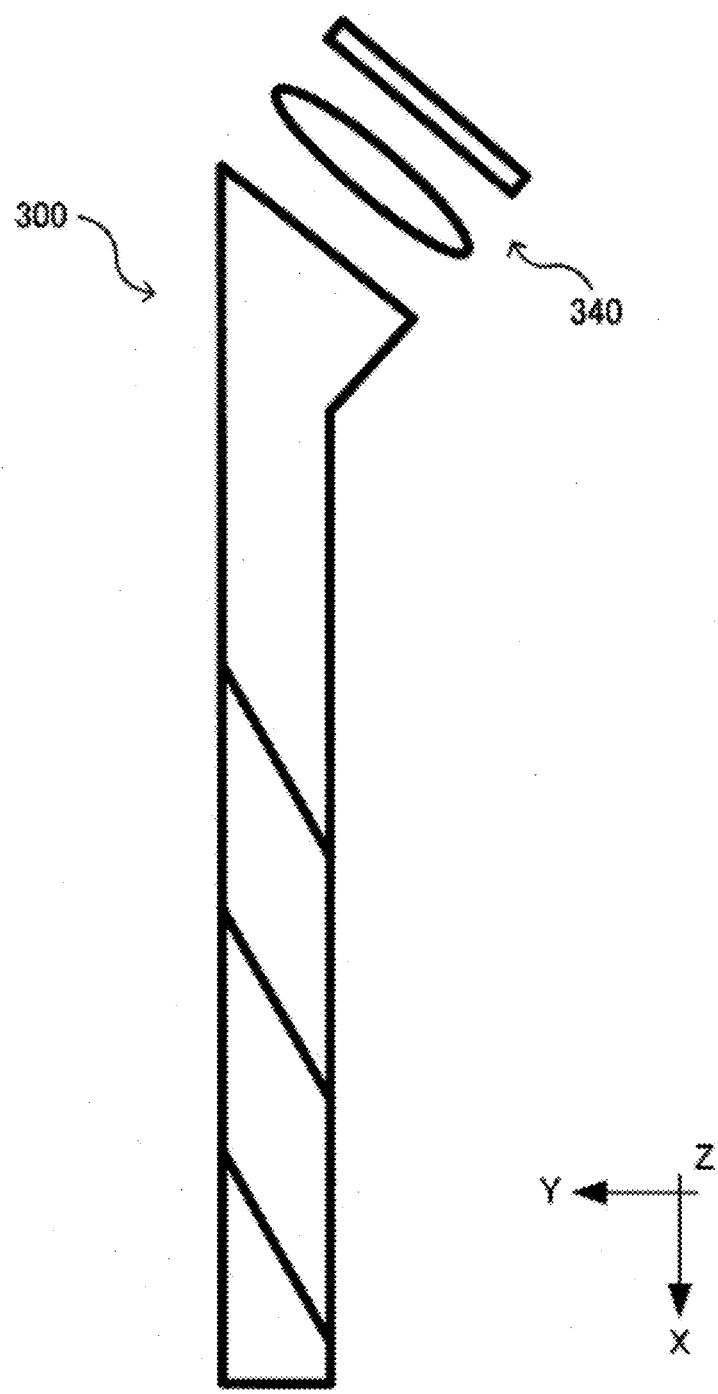
FIG. 7 A plan view illustrating a light guide in which the size of the right surface and input luminous flux has been increased.

FIG. 1 is a drawing illustrating the general configuration and optical path in the XY plane of a goggle type display (display device) of the present invention, and FIG. 2 is drawing illustrating the propagation range of luminous flux in FIG. 1. Similar parts have been assigned the same reference symbols as in goggle type display 101 described above.

The goggle type display 1 has an appearance similar to goggles, and comprises an output unit 40 which outputs image display light L, a light guide (optical element) 100 which internally reflects the image display light L from the output unit 40 and guides it to the eye E of the viewer, and a frame part F to which the output unit 40 and light guide 100 are attached.

The light guide unit 100 comprises a main substrate 10 with a main beam splitter surface 11 formed inside, a secondary substrate 20, and a secondary beam splitter surface 30.

The secondary substrate 20 has a front surface 20a, a rear surface 20b located opposite the front surface 20a in the −Y direction, a right surface 20c, a left surface 20d located opposite the right surface 20c in the X direction, a top surface (not illustrated), and a bottom surface (not illustrated) located opposite the top surface in the Z direction.

The front surface 20a and rear surface 20b are parallel to the X direction (set direction). Namely, the front surface 10*a*, rear surface 10*b*, front surface 20*a* and rear surface 20*b* are parallel to the X direction (set direction).

Furthermore, the gap between the front surface 20*a* and the rear surface 20*b* is a prescribed distance (thickness) determined by the designer using calculation formulas, simulation software and the like in consideration of the difference (offset) between the optical path of the image display light L which advances inside the main substrate 10 and the optical path of the image display light L which advances inside the secondary substrate 20, so that dropouts of luminous flux propagating inside the main substrate 10 do not occur.

The material of the secondary substrate includes light transmitting materials such as glass (BK7), resin (polycarbonate, polymethacrylic acid (PMMA), cycloolefin, etc.) or the like, where from the standpoint of ease of manufacturing, change in response to temperature, etc., glass is preferable, and from the standpoint of safety, such as resistance to breaking during use, polycarbonate is preferable. It will be noted that for the material of the main substrate and the secondary substrate, glass types of different refractive index, mechanical strength, etc. may be combined, and also the main substrate and secondary substrate may be formed by combining different materials, such as by making the main substrate from glass and the secondary substrate from polycarbonate.

The secondary beam splitter surface 30 makes it possible to reflect a set fraction of the luminous flux of inputted image display light L and to transmit a set fraction of the luminous flux of the image display light L.

The set fractions of light reflected and transmitted by the secondary beam splitter surface are fractions set by the designer using calculation formulas, simulation software and the like, so that the brightness of the area where dropouts of luminous flux propagating inside the main substrate 10 have been eliminated will be more uniform with the brightness of the other areas, being preferably 20% or greater and 80% or less, for example, 50%, etc.

Furthermore, the secondary beam splitter surface 30 may be formed for example on the rear surface 20*b* of the secondary substrate 20 through optical coating, with the front surface 10*a* of the main substrate 10 being bonded to the rear surface 20*b* of the secondary substrate 20, which is preferable from the standpoint of facilitating fixation of the elements, and moreover may be arranged between the front surface 10*a* of the main substrate 10 and the rear surface 20*b* of the secondary substrate 20 by being directly bonded (optical contact, anodic bonding, diffusion bonding, ambient temperature bonding, thermal bonding, fluoric acid bonding, etc.), which is preferable from the standpoint of eliminating the need for adhesive with a predetermined refractive index.

It should be noted that the secondary beam splitter surface 30 may be formed by making use of reflection occurring due to a combination of materials of different refractive indices for the main substrate 10 and secondary substrate 20, and may also be formed by filling the space between the main substrate 10 and secondary substrate 20 with a medium such as adhesive, air or oil, and making use of reflection generated due to the difference between the refractive index of that medium and the refractive index of the main substrate 10 and secondary substrate 20.

In such a goggle type display 1, first, image display light L of the display region from the output unit 40 is inputted inside the main substrate 10 through the right surface 10*c*. Here, the image display light L from the output unit 40 is inputted inside through the right surface 10*c* in a direction perpendicular to the right surface 10*c*, and the right surface 10*c* causes the image display light L of the display region from the output unit 40 to be inputted such that it advances substantially in the X direction (set direction).

The front surface 10*a* and rear surface 10*b* reflect the image display light L of the display region multiple times in alternation, causing it to advance in the X direction (set direction). Here, the advancing image display light L reaches the secondary beam splitter surface 30 (front surface 10*a*), and the secondary beam splitter surface 30 (front surface 10*a*) reflects a set fraction of the luminous flux of the inputted image display light L and transmits a set fraction of the luminous flux of the image display light L. Namely, when the image display light L reaches the secondary beam splitter surface 30 (front surface 10*a*), a set fraction of the luminous flux of the image display light L advances inside the main substrate 10, and a set fraction of the luminous flux of the image display light L advances inside the secondary substrate 20.

Furthermore, the image display light L which has advanced inside the secondary substrate 20 is reflected by the front surface 20*a* and then reaches the secondary beam splitter surface 30 (front surface 10*a*). Thereupon, the secondary beam splitter surface 30 (front surface 10*a*) reflects a set fraction of the luminous flux of the inputted image display light L and transmits a set fraction of the luminous flux of the image display light L. Namely, a set fraction of the luminous flux of the image display light L advances inside the main substrate 10 and a set fraction of the luminous flux of the image display light L advances through the inside of the secondary substrate 20.

Thereafter, the image display light L which has advanced through the inside of the main substrate 10 or the secondary substrate 20 reaches the first main beam splitter surface 11*a*. Here, the first main beam splitter surface 11*a* reflects a prescribed fraction of the luminous flux of the inputted image display light L and transmits a prescribed fraction of the luminous flux of the image display light L. Namely, the luminous flux of image display light La is guided toward the viewer.

Furthermore, the image display light L which has been transmitted through the first main beam splitter surface 11*a* or which has advanced through the inside of the secondary substrate 20 reaches the second main beam splitter surface 11*b*. Here, the second main beam splitter surface 11*b* reflects a prescribed fraction of the luminous flux of the inputted image display light L and transmits a prescribed fraction of the luminous flux of the image display light L. Namely, the luminous flux of image display light Lb is guided toward the viewer.

Moreover, image display light L which has been transmitted through the first main beam splitter surface 11*a* or through the second main beam splitter surface 11*b* or which has advanced through the inside of the secondary substrate 20 reaches the third main beam splitter surface 11*c*. Here, the third main beam splitter surface 11*c* reflects a prescribed fraction of the luminous flux of the inputted image display light L and transmits a prescribed fraction of the luminous flux of the image display light L. Namely, the luminous flux of image display light Lc is guided toward the viewer.

With the goggle type display 1 of the present invention, as described above, the image display light L is split and magnified by the secondary beam splitter surface 30, making it possible to prevent the occurrence of regions where luminous flux propagating through the inside of the main substrate 10 is not present (dropouts). Furthermore, since the secondary substrate 20 is bonded to the front surface 10*a* of the main substrate 10, the overall strength of the light guide unit 100 is improved. Moreover, when image display light L advances in the X direction (set direction), since there exists image display light L which passes through the inside of the secondary substrate 20 without being transmitted through the main beam splitter surfaces 11a and 11b, the difference between the light quantity outputted to the outside from the first main beam splitter surface 11a and the light quantity outputted to the outside from the third main beam splitter surface 11c becomes smaller, allowing the brightness (light quantity) to be made more uniform.

Second Mode of Embodiment

Figure 8:
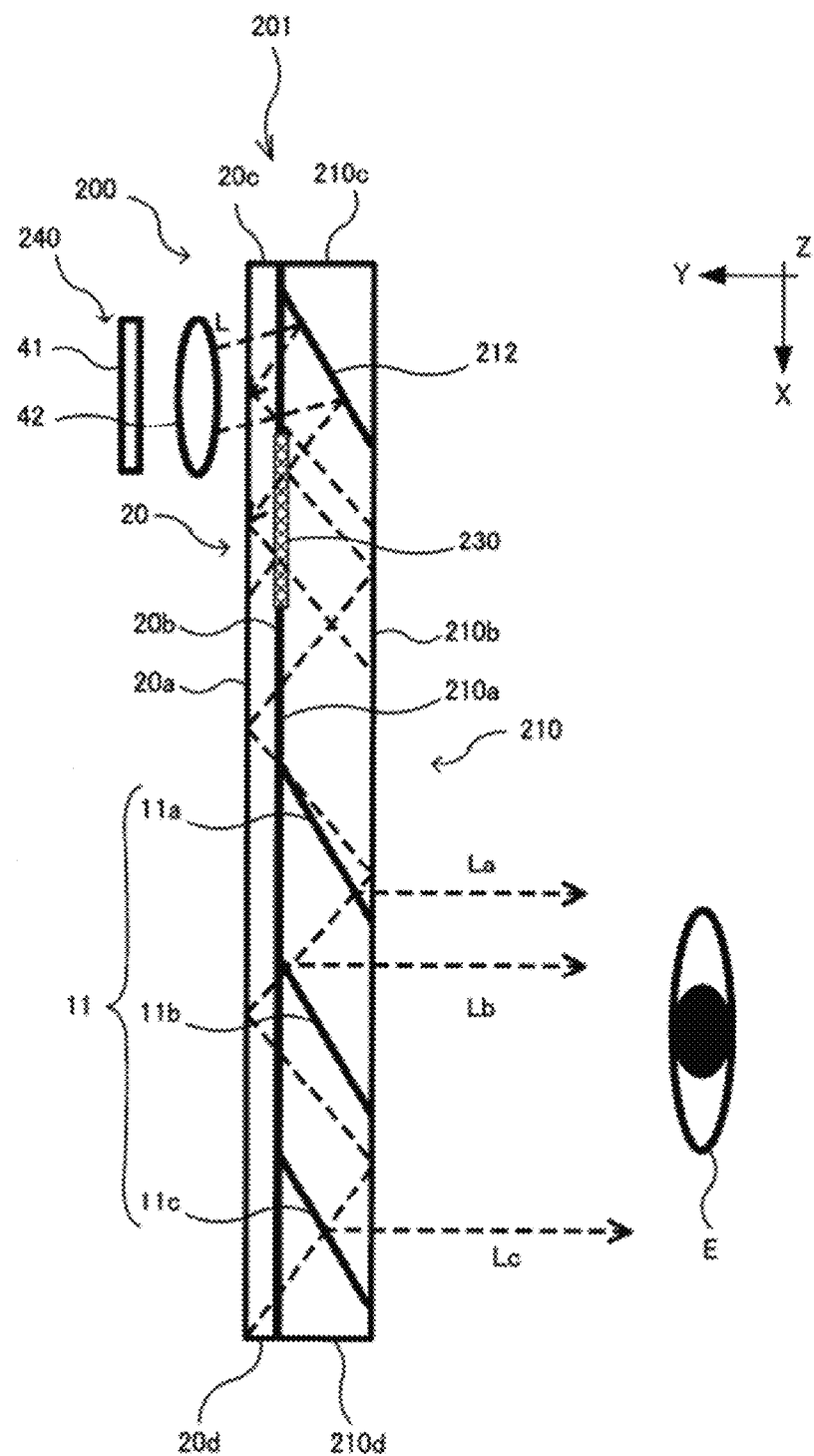
FIG. 8 A drawing illustrating the general configuration and optical path in the XY plane of a goggle type display of the present invention.
Figure 9:
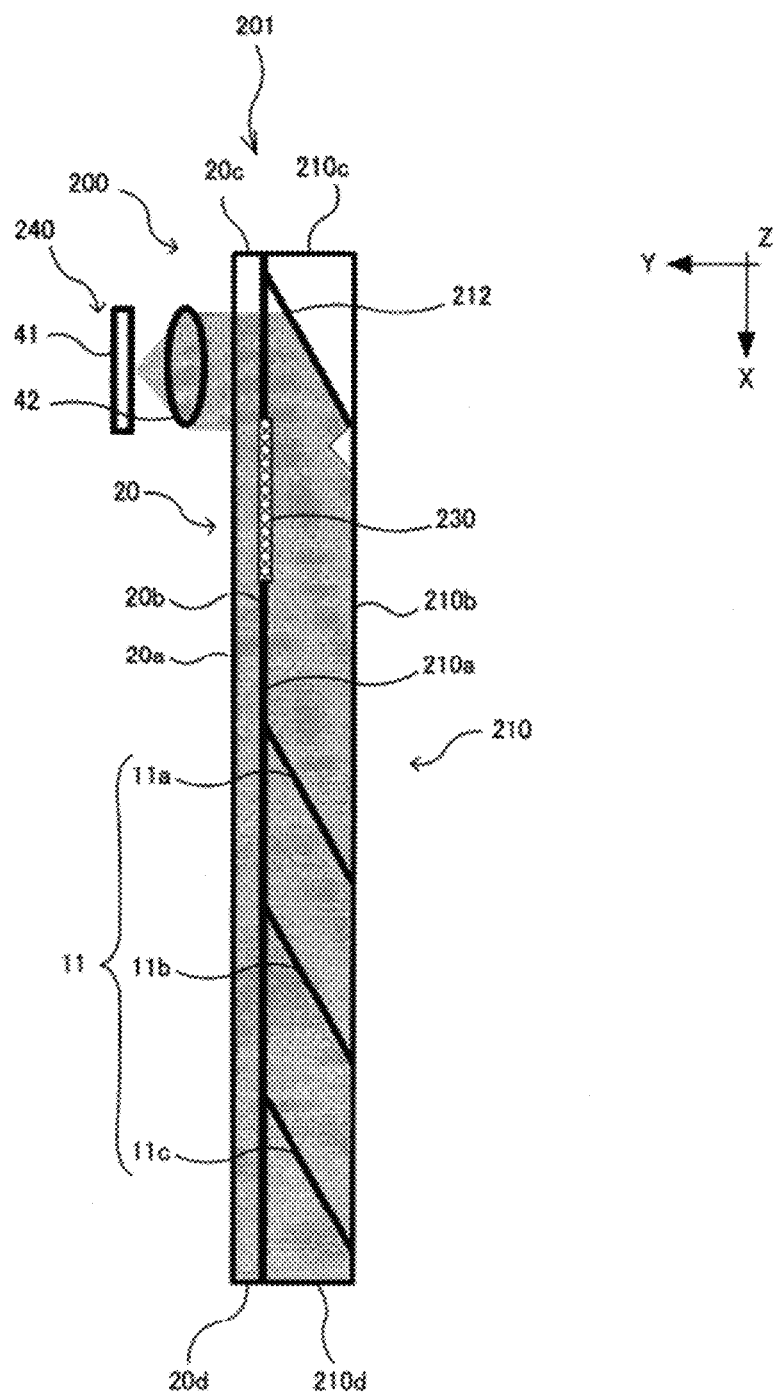
FIG. 9 A drawing illustrating the propagation range of luminous flux in FIG. 8.

FIG. 8 is a drawing illustrating the general configuration and optical path in the XY plane of a goggle type display (display device) of the present invention, and FIG. 9 is a drawing illustrating the propagation range of luminous flux in FIG. 8. Similar parts have been assigned the same reference symbols as in goggle type display 1 described above.

The goggle type display 201 has an appearance similar to goggles, and comprises an output unit 240 which outputs image display light L, a light guide unit (optical element) 200 which internally reflects the image display light L from the output unit 240 and guides it to the eye E of the viewer, and a frame part F to which the output unit 240 and light guide 200 are attached.

The light guide unit 200 comprises a main substrate 210, secondary substrate 20 and secondary beam splitter surface 230.

The main substrate 210 comprises a front surface 210a, a rear surface 210b located opposite the front surface 210a in the Y direction, a right surface 210c, a left surface 210d located opposite the right surface 210c in the X direction, a top surface (not illustrated), and a bottom surface (not illustrated) located opposite the top surface in the Z direction, and furthermore has a reflective surface 212 and main beam splitter surface 11 formed inside. The front surface 210a and the rear surface 210b are parallel to the X direction (set direction).

The reflective surface 212 is arranged in the right part of the inside of the main substrate 210 and is arranged to have an angle β to the X direction when viewed from the Z direction. For the reflective surface 212, a silver coating is applied to reflect the entire luminous flux of inputted image display light L in the X direction (set direction). It will be noted that the reflective surface is not limited to silver coating and may also be another metal coating (for example, aluminum coating), and may also be formed as a dielectric multilayer coating, not as a metal coating, or a different medium such as air may be used to the right of the reflective surface and the reflection generated by the refractive index difference thereof may be utilized.

The secondary beam splitter surface 230 makes it possible for a set fraction of the luminous flux of the inputted image display light L to be reflected and for a set fraction of the luminous flux of the image display light L to be transmitted.

Furthermore, the secondary beam splitter surface 230 is formed through optical coating on a prescribed region of the front surface 210a of the main substrate 210, and the front surface 210a of the main substrate 210 and rear surface 20b of the secondary substrate 20 are directly bonded and are thereby arranged between a prescribed region of the front surface 210a of the main substrate 210 and a prescribed region of the rear surface 20b of the secondary substrate 20.

Here, the prescribed region where the secondary beam splitter surface 230 is arranged is at a location such that image display light L is reflected by reflective surface 212 and is then reflected by the front surface 210a and is not reflected again by the reflective surface 212. In this way, image display light L which is reflected two or more times by the reflective surface 212 is eliminated and the occurrence of stray light is prevented.

The output unit 240 is arranged such that image display light L from the output mechanism will be inputted inside through the front surface 20a of the secondary substrate 20 in a direction perpendicular to the front surface 20a. As a result, when image display light L from the output unit 240 is inputted inside through the front surface 20a in a direction perpendicular to the front surface 20a, it advances toward the reflective surface 212 of the main substrate 210.

In this sort of goggle type display 201, first, image display light L of the display region from the output unit 240 is inputted inside the secondary substrate 20 through the front surface 20a. Here, the image display light L from the output unit 240 is inputted inside through the front surface 20a in a direction perpendicular to the front surface 20a. The inputted image display light L then reaches the reflective surface 212, and the reflective surface 212 reflects the image display light L of the display region substantially in the X direction.

The front surface 20a and rear surface 210b reflect the image display light L of the display region multiple times in alternation, causing it to advance in the X direction (set direction). Here, the advancing image display light L reaches the secondary beam splitter surface 230, and the secondary beam splitter surface 230 reflects a set fraction of the luminous flux of the inputted image display light L and transmits a set fraction of the luminous flux of the image display light L. Namely, when the image display light L reaches the secondary beam splitter surface 230, a set fraction of the luminous flux of the image display light L advances inside the main substrate 210, and a set fraction of the luminous flux of the image display light L advances inside the secondary substrate 20.

It will be noted that the thickness of the secondary substrate 20 and the region of the secondary beam splitter surface 230 are set in such a way that image display light L which has been reflected once by the reflective surface 212 will not enter the reflective surface 212 again after being reflected by the front surface 20a or secondary beam splitter surface 230.

Furthermore, the image display light L which has advanced inside the secondary substrate 20 is reflected by the front surface 20a and then reaches the secondary beam splitter surface 230. Thereupon, the secondary beam splitter surface 230 reflects a set fraction of the luminous flux of the inputted image display light L and transmits a set fraction of the luminous flux of the image display light L. Namely, a set fraction of the luminous flux of the image display light L advances inside the main substrate 210 and a set fraction of the luminous flux of the image display light L advances through the inside of the secondary substrate 20.

Thereafter, the image display light L which has advanced through the inside of the main substrate 210 or the secondary substrate 20 reaches the first main beam splitter surface 11a, the second main beam splitter surface 11b and the third main beam splitter surface 11c. Here, the first main beam splitter surface 11a, the second main beam splitter surface 11b and the third main beam splitter surface 11c reflect a prescribed fraction of the luminous flux of the inputted image display light L and transmit a prescribed fraction of the luminous flux of the image display light L. Namely, the luminous flux of image display light La, Lb and Lc is guided toward the viewer.

With the goggle type display 201 of the present invention, as described above, since a secondary substrate 20 of a set minimal thickness is arranged in front of the reflective surface 212, stray light which is reflected two or more times by the reflective surface 212 (for example, luminous flux which has been reflected by the reflective surface 212, which is then reflected by the front surface 20a and is then reflected not by the rear surface 210b but again by the reflective surface 212) is eliminated, and splitting and magnification are performed by the secondary beam splitter surface 230, thereby making it possible to prevent the occurrence of regions where luminous flux propagating through the inside of the main substrate 210 is not present (dropouts). Furthermore, since the secondary substrate 20 is bonded to the front surface 210a of the main substrate 210, the overall strength of the light guide unit 200 is improved. Moreover, by not including the secondary beam splitter surface 230 in the region where the viewer views the outside world through the light guide unit 200, thereby separating the region through which the outside world is viewed from the region where the secondary beam splitter surface 230 is arranged, the effect of making the secondary beam splitter surface 230 not noticeable to the viewer is achieved.

Third Mode of Embodiment

Figure 10:
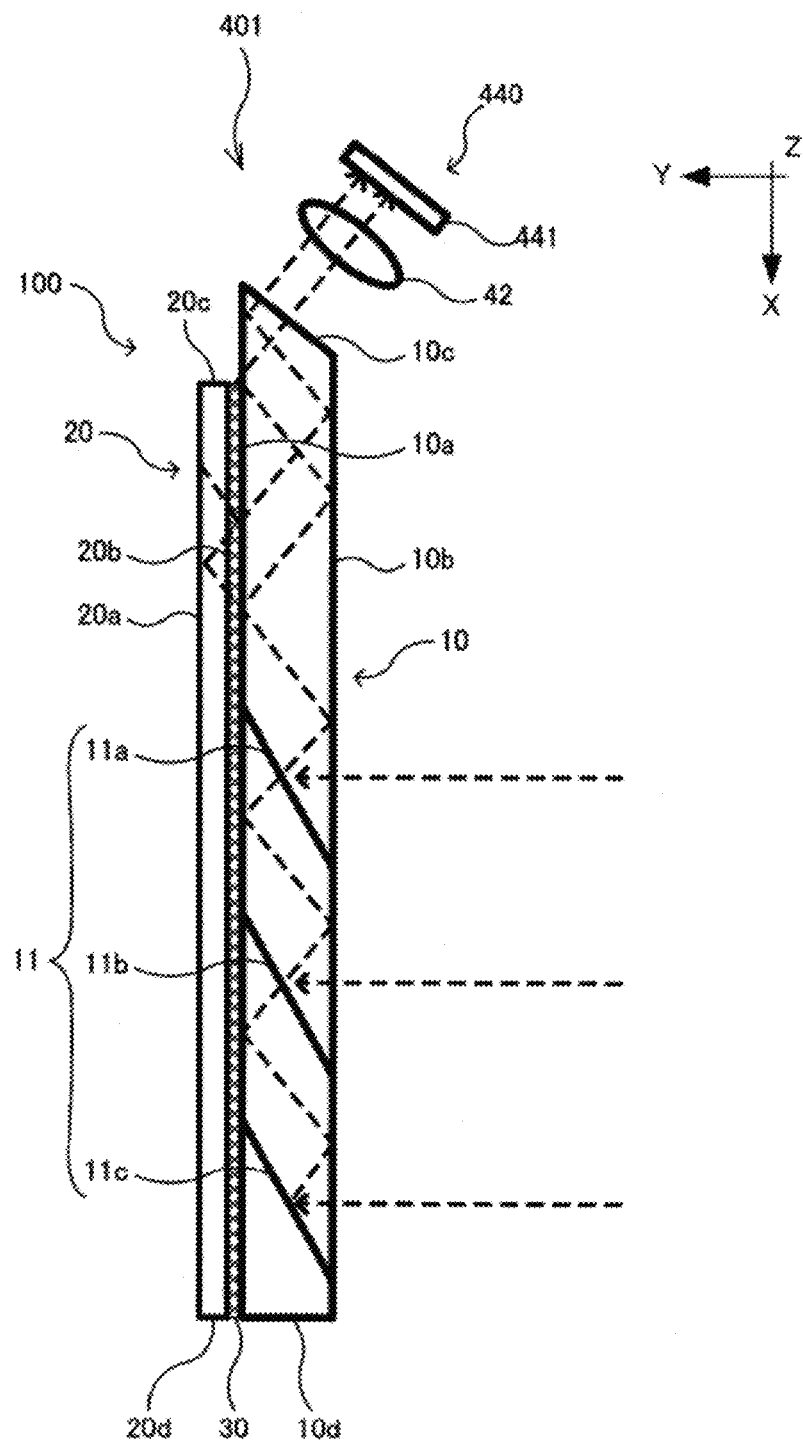
FIG. 10 A drawing illustrating the general configuration and optical path in the XY plane of a photoreceptor device of the present invention.

FIG. 10 is a drawing illustrating the general configuration and optical path in the XY plane of a photoreceptor device of the present invention. Similar parts have been assigned the same reference symbols as in goggle type display 101 described above.

The photoreceptor device 401 comprises a photoreceptor unit (photoreceptor optical system) 440 which receives light, and a light guide unit (optical element) 100 which internally reflects light from the outside, guiding it to the photoreceptor unit 440.

The photoreceptor unit 440 comprises a photoreceptor mechanism arranged opposite the right surface 10c and having a photoreceptor element 441 and optical system 42; and a control unit (not illustrated) in which signals from the photoreceptor mechanism are inputted.

In such a photoreceptor device 401, first, light from the outside is inputted inside the main substrate 10 through the rear surface 10b. The light then reaches first main beam splitter surface 11a, second main beam splitter surface 11b and third main beam splitter surface 11c. Here, the first main beam splitter surface 11a, the second main beam splitter surface 11b and the third main beam splitter surface 11c reflect a prescribed fraction of the luminous flux of the inputted light so that it advances substantially in the –X direction, and transmit a prescribed fraction of the luminous flux of the light.

The front surface 10a and rear surface 10b reflect the light multiple times in alternation, causing it to advance in the –X direction (set direction). Here, the advancing light reaches the secondary beam splitter surface 30 (front surface 10a), and the secondary beam splitter surface 30 (front surface 10a) reflects a set fraction of the luminous flux of the inputted light and transmits a set fraction of the luminous flux of the light. Namely, when the light reaches the secondary beam splitter surface 30 (front surface 10a), a set fraction of the luminous flux of the light advances through the inside of the main substrate 10, and a set fraction of the luminous flux of the light advances inside the secondary substrate 20.

Furthermore, the light which has advanced inside the secondary substrate 20 is reflected by the front surface 20a and then reaches the secondary beam splitter surface 30 (front surface 10a). Here, the secondary beam splitter surface 30 (front surface 10a) reflects a set fraction of the luminous flux of the inputted light and transmits a set fraction of the luminous flux of the light. Namely, a set fraction of the luminous flux of the light advances inside the main substrate 10 and a set fraction of the luminous flux of the light advances through the inside of the secondary substrate 20.

Thereafter, light which has advanced through the inside of the main substrate 10 or which has advances through the inside of the secondary substrate 20 reaches the right surface 10c. The light outputted from the right surface 10c is then guided to the photoreceptor unit 440.

With the photoreceptor device 401 of the present invention, as described above, the total luminous flux which reaches the first main beam splitter surface 11a, second main beam splitter surface 11b and third main beam splitter surface 11c can be received. Thus, the photoreceptor device 401 of the present invention is able to sense the object of sensing in whatever region of the luminous flux is may be present.

Figure 11:
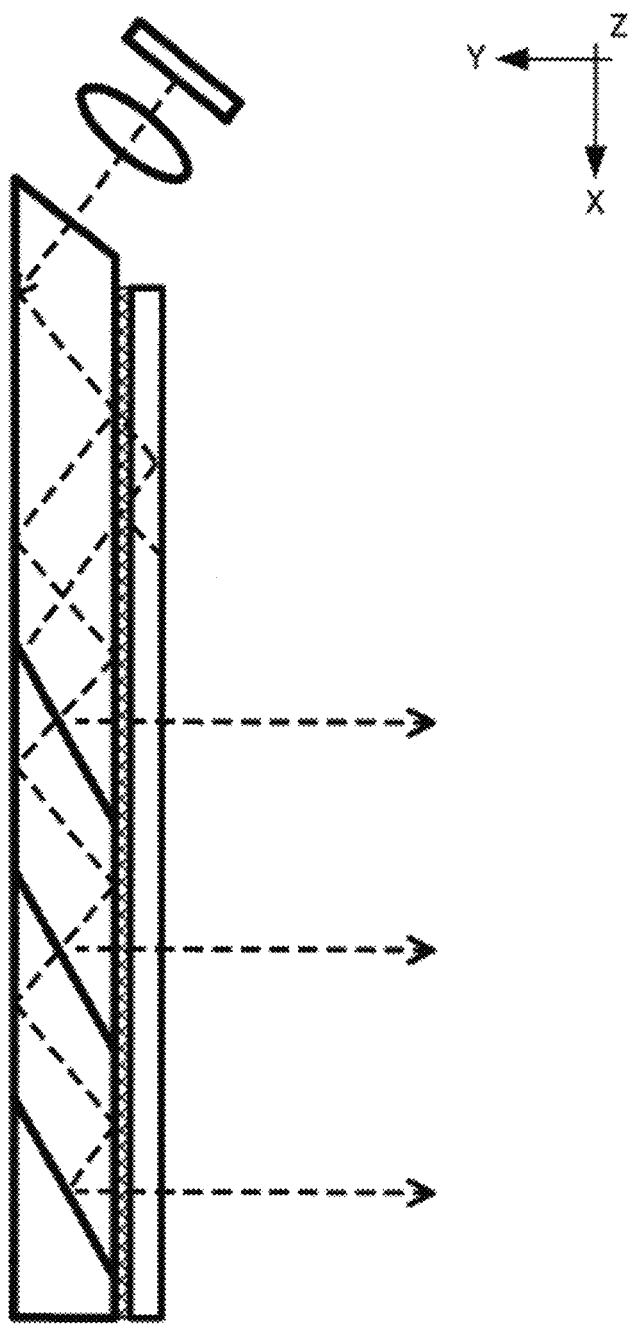
FIG. 11 A drawing illustrating the general configuration of a light guide unit of the present invention.

OTHER MODES OF EMBODIMENT (1) The goggle type display 1 described above was configured with the secondary beam splitter surface 30 being arranged between the front surface 10a of the main substrate 10 and the rear surface 20b of the secondary substrate 20, but it may also be configured by swapping the locations of the main substrate 10 and secondary substrate 20, with the secondary beam splitter surface 30 being arranged between the rear surface 10b of the main substrate 10 and front surface 20a of the secondary substrate 20. FIG. 11 is a drawing illustrating the general configuration of a light guide unit (optical element) of the present invention.

Figure 12:
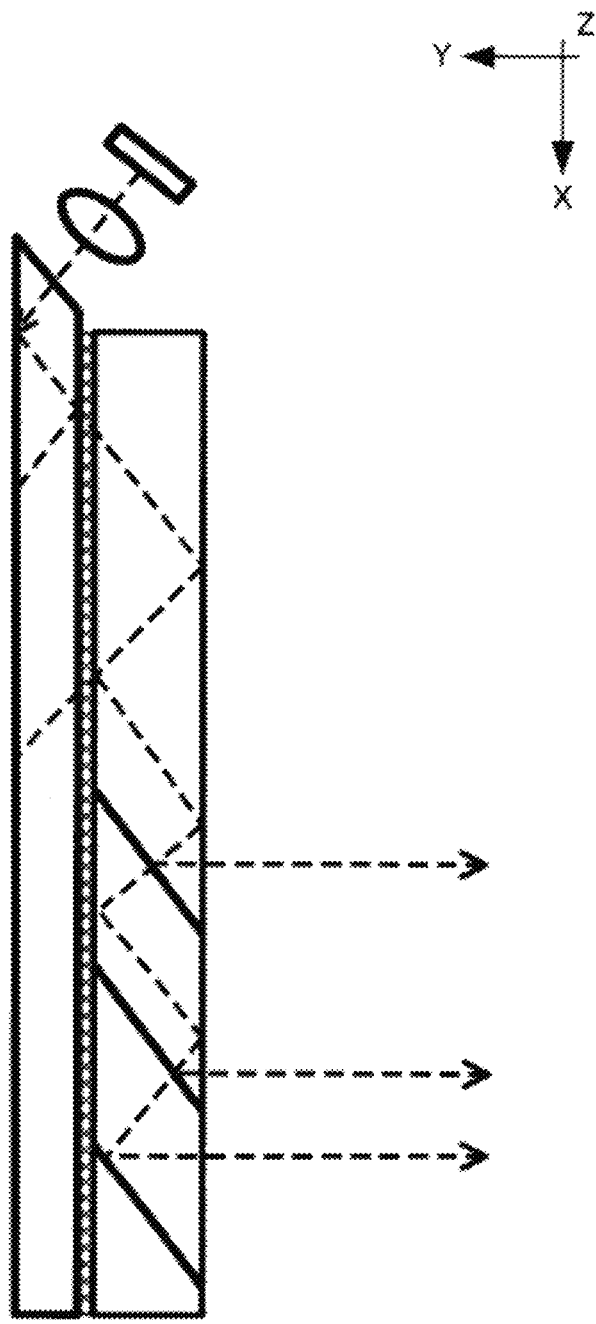
FIG. 12 A drawing illustrating the general configuration of a light guide unit of the present invention.

(2) The goggle type display 1 described above was configured such that image display light L from the output unit 40 was inputted inside the main substrate 10 through the right surface 10c, but a configuration wherein the image display light L is inputted inside the secondary substrate through the right surface of the secondary substrate may also be employed. In this case, the concentration of complex processing on a single substrate can be avoided, so productivity is improved. Furthermore, when the width of the transmissive liquid crystal display 41 is reduced, there is no need to increase the number of main beam splitter surfaces inside the main substrate in order to accommodate the range of movement of the viewer in the X direction, so productivity is better. FIG. 12 is a drawing illustrating the general configuration of a light guide unit (optical element) of the present invention.

Figure 13:
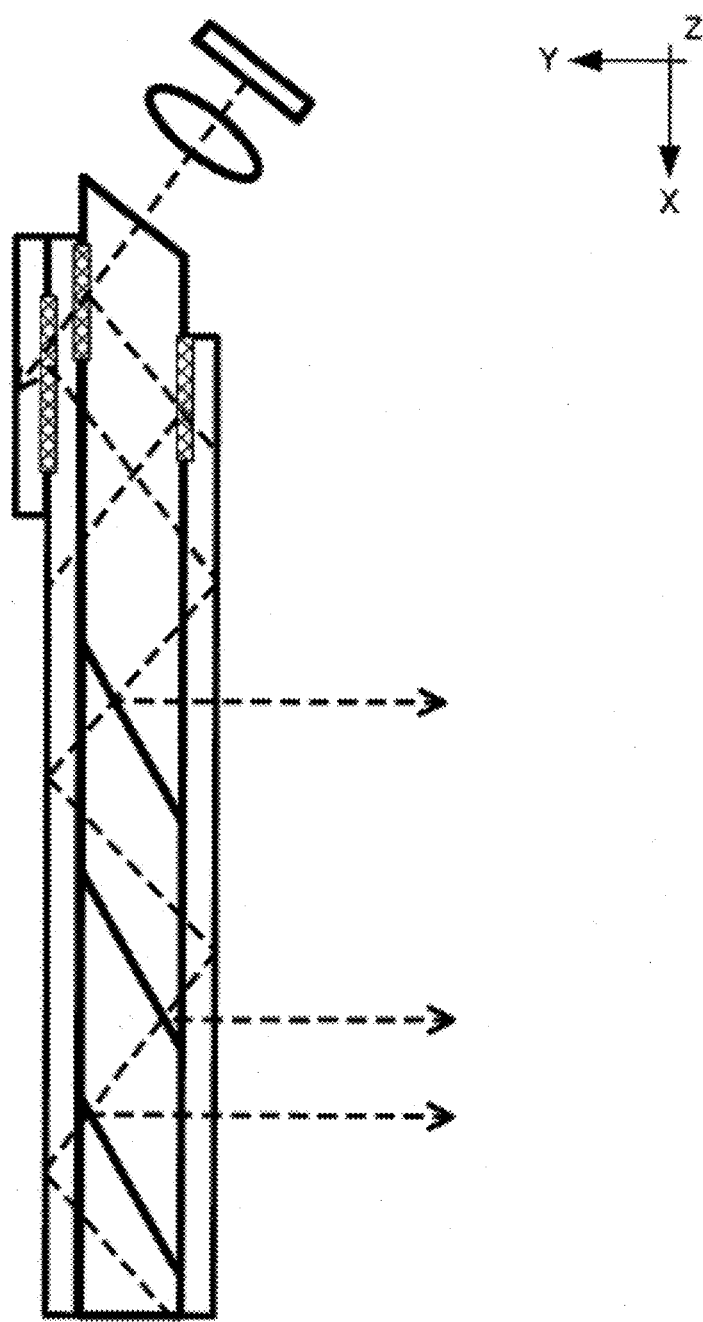
FIG. 13 A drawing illustrating the general configuration of a light guide unit of the present invention.

(3) In the goggle type display 1 described above, the light guide unit 100 had a configuration comprising a main substrate 10, secondary substrate 20 and secondary beam splitter surface 30, but a plurality of secondary substrates may additionally be arranged. In this case, it becomes possible to further narrow the region for arrangement of the secondary beam splitter surface necessary in order to prevent dropouts of luminous flux, and by not including the secondary beam splitter surface in the region where the viewer views the outside world through the light guide unit, thereby separating the region through which the outside world is viewed from the region where the secondary beam splitter surface is arranged, the effect of making the secondary beam splitter surface not noticeable to the viewer is reinforced. Furthermore, this has the effect of making the light quantity more uniform. Moreover, substrates may be arranged only on one side of the main substrate but also so as to sandwich the main substrate. FIG. 13 is a drawing illustrating the general configuration of a light guide unit (optical element) of the present invention.

(4) In the goggle type display 1 described above, the light guide unit 100 had a configuration comprising a main substrate 10, secondary substrate 20 and secondary beam splitter surface 30, but it is also possible to additionally arrange a secondary substrate in a prescribed region only, without an intervening secondary beam splitter surface.

Since light is split and magnified by the secondary beam splitter surface, there are cases where luminous fluxes will combine at the same optical path length, generating interference fringes, but with a light guide unit of this type, it is possible to create an optical path offset or an optical path length difference exceeding the coherence length of the luminous flux, making it possible as a result to prevent the occurrence of interference fringes.

(5) In the goggle type display 1 described above, the secondary beam splitter surface 30 was formed and arranged over the rear surface 20*b* of the secondary substrate 20, but it may also be formed and arranged over the front surface 10*a* of the main substrate 10, or it may be formed and arranged both over the rear surface 20*b* of the secondary substrate 20 and over the front surface 10*a* of the main substrate 10.

Figure 14:
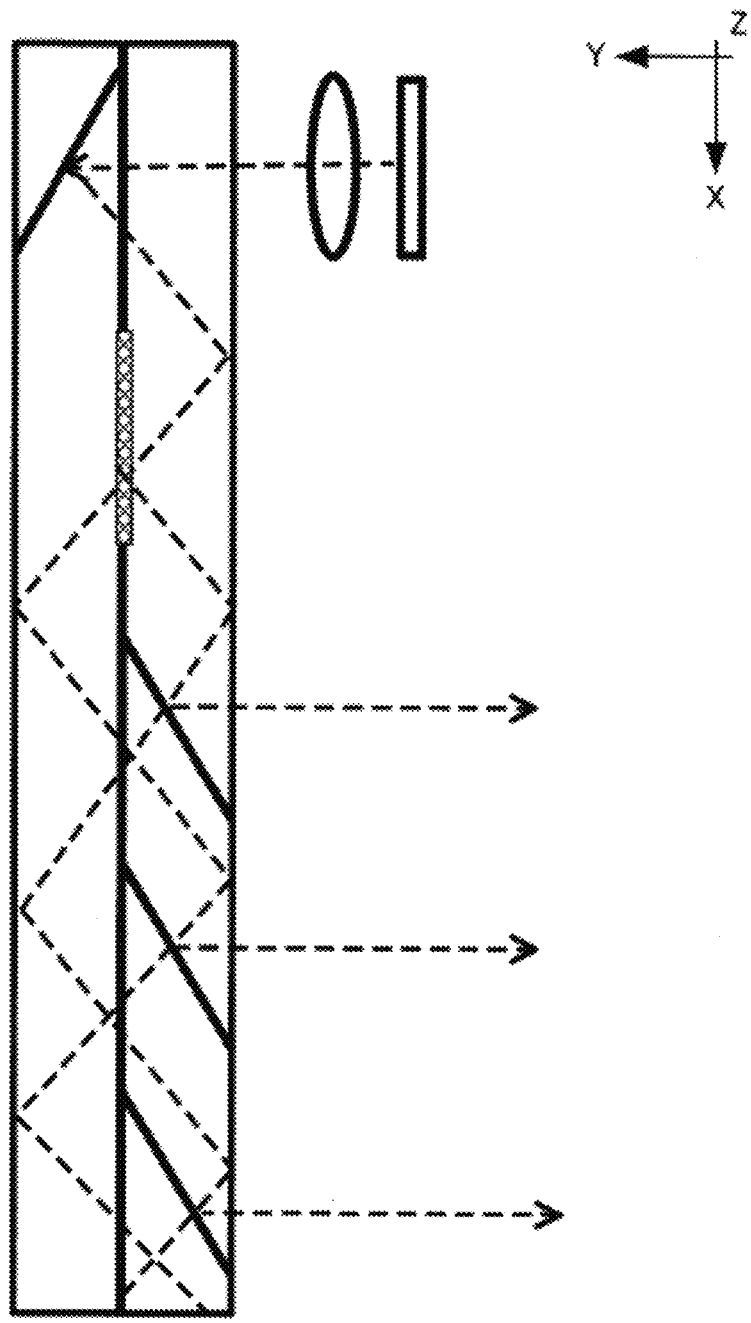
FIG. 14 A drawing illustrating the general configuration of a light guide unit of the present invention.

(6) The goggle type display 201 described above was configured with a reflective surface 212 being formed on the main substrate 210, but a configuration wherein the reflective surface is formed on the secondary substrate may also be employed. Furthermore, the image display light L from the output mechanism may also be inputted inside through the rear surface of the main substrate. FIG. 14 is a drawing illustrating the general configuration of a light guide unit (optical element) of the present invention.

Figure 15:
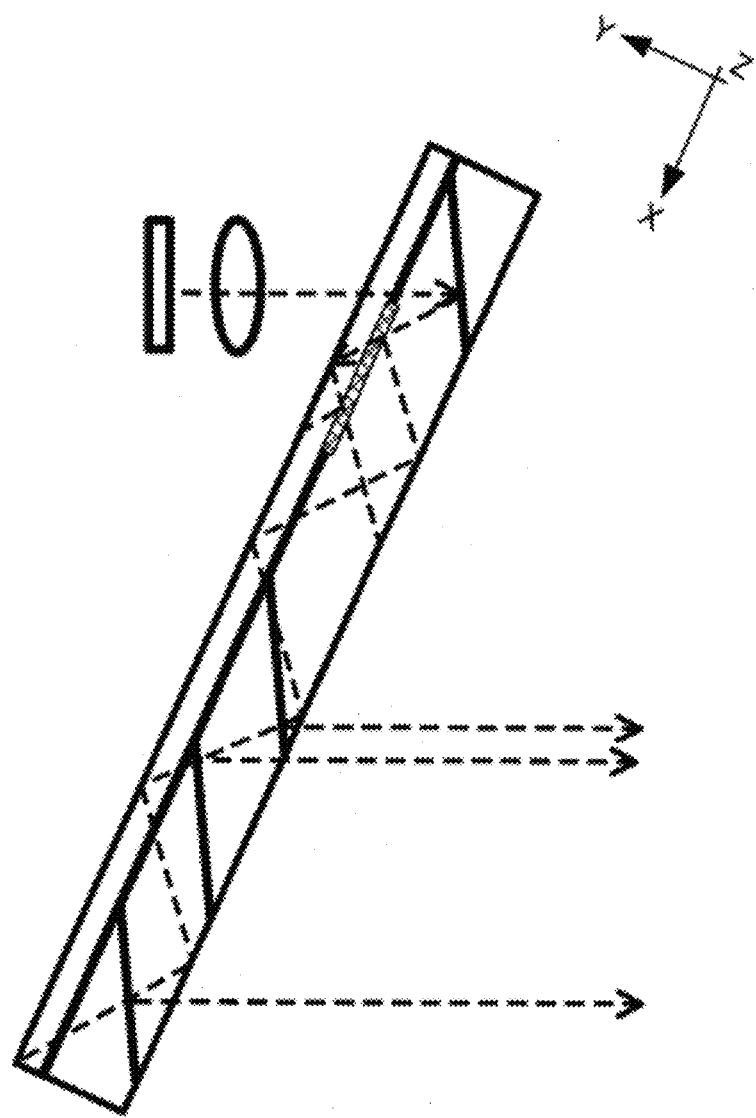
FIG. 15 A drawing illustrating the general configuration of a light guide unit of the present invention.

(7) Furthermore, in the modes of embodiment described above, a configuration was employed wherein the light guide unit 200 was arranged horizontally in relation to the viewer, but it is also possible instead, taking the arrangement of the output mechanism, etc. into consideration, to arrange the light guide diagonally in relation to the viewer and make the input or output of luminous flux to or from the light guide not perpendicular but rather diagonal to the light guide. FIG. 15 is a drawing illustrating the general configuration of a light guide unit (optical element) of the present invention.

(8) Furthermore, in the modes of embodiment described above, configurations using a light guide unit 100, 200 in a goggle type display were employed, but it is possible instead to employ a configuration wherein a sensor (image pickup element) is arranged at the location of the viewer.

FIELD OF INDUSTRIAL APPLICATION

The present invention can be used in optical elements, etc. for propagating light in a set direction.

DESCRIPTION OF REFERENCE SYMBOLS

1 Goggle type display (display device)
10 Main substrate
11 Main beam splitter surface
20 Secondary substrate
30 Secondary beam splitter surface
40 Output unit
100 Light guide unit (optical element)
L Image display light
E Eye of the viewer

The invention claimed is:

1. An optical element comprising a main substrate fabricated from light transmitting material, wherein a front surface and a rear surface of said main substrate are parallel to a set direction and are configured to internally reflect a first set fraction of an input light beam that is incident on a side surface of said main substrate and cause the first set fraction of the input light beam to advance in the set direction, and having at least one main beam splitter surface formed diagonally to said set direction inside said main substrate, the optical element being further characterized in that it comprises a secondary substrate fabricated from light transmitting material, wherein a front surface and a rear surface of said secondary substrate are parallel to the set direction are configured to internally reflect a second set fraction of the input light beam and cause the second set fraction of the input light beam to advance in the set direction, and a secondary beam splitter surface is arranged on a prescribed region between the front surface of the secondary substrate and the rear surface of said main substrate or between the rear surface of the secondary substrate and the front surface of said main substrate, and is configured to reflect the first set fraction of the input light beam, and is configured to transmit the second set fraction of the input light beam between the main substrate and the secondary substrate, wherein the secondary beam splitter surface is configured with a transmittance of 20% to 80%, wherein the prescribed region is less than an entire surface of the front surface of the secondary substrate, the rear surface of said main substrate, the rear surface of the secondary substrate, or the front surface of said main substrate, wherein a reflective surface is formed diagonally to said set direction inside said main substrate or said secondary substrate, wherein the prescribed region is arranged at a location such that the input light beam is not reflected by said reflective surface two or more times, and wherein an entirety of the prescribed region is between said reflective surface and said at least one main beam splitter surface.

2. An optical element as set forth in claim 1, characterized in that the input light beam is inputted or outputted through a surface other than the front surface and rear surface of said main substrate and the front surface and rear surface of said secondary substrate.

3. A display device characterized in that it comprises an optical element as set forth in claim 2, and
an output optical system which outputs the input light beam.

4. A photoreceptor device characterized in that it comprises an optical element as set forth in claim 2, and
a photoreceptor optical system which detects the input light beam.

5. An optical element as set forth in claim 1, characterized in that the input light beam is inputted through at least one surface from among the front surface and rear surface of said main substrate and the front surface and rear surface of said secondary substrate and reaches said reflective surface, or is outputted through at least one surface from among the front surface and rear surface of said main substrate and the front surface and rear surface of said secondary substrate after reaching said reflective surface.

6. A display device characterized in that it comprises an optical element as set forth in claim 5, and
   an output optical system which outputs the input light beam.

7. A photoreceptor device characterized in that it comprises an optical element as set forth in claim 5, and
   a photoreceptor optical system which detects the input light beam.

* * * * *